United States Patent [19]

Belivakici et al.

[11] 3,931,380

[45] Jan. 6, 1976

[54] METHOD OF MAKING NESTABLE FOAMED PLASTIC CUPS

[75] Inventors: Ilie Mila Belivakici, Kendall Park; Clifford Clayton Goehring; James Alan Wachtel, both of Princeton; William Joseph Lahm, Middlesex, all of N.J.; Carl Richard Storms, Easton, Pa.

[73] Assignee: American Can Company, Greenwich, Conn.

[22] Filed: Dec. 26, 1973

[21] Appl. No.: 427,739

Related U.S. Application Data

[62] Division of Ser. No. 214,847, Jan. 3, 1972, abandoned.

[52] U.S. Cl............. 264/45.5; 156/245; 229/1.5 B; 264/45.4; 264/46.1; 264/53; 264/248; 264/321
[51] Int. Cl.²......................................... B29D 27/00
[58] Field of Search......... 264/51, 45, 321, 48, 248, 264/45.5, 45.4, 46.1; 229/65 B; 156/245

[56] References Cited

UNITED STATES PATENTS

| | | | |
|---|---|---|---|
| 3,311,681 | 3/1967 | Cherney et al. | 264/48 |
| 3,454,208 | 7/1969 | Amberg et al. | 229/1.5 B X |
| 3,658,615 | 4/1972 | Amberg | 264/321 X |
| 3,666,162 | 5/1972 | Tiffin et al. | 229/1.5 B |
| 3,673,033 | 6/1972 | MacDaniel et al. | 264/248 X |

*Primary Examiner*—Philip Anderson
*Attorney, Agent, or Firm*—Robert P. Auber; Ernestine C. Bartlett; George P. Ziehmer

[57] ABSTRACT

Cups having a sidewall made from foam sheet plastic with a fusion sealed, lapped seam, wherein the lapped seam and the sidewall immediately adjacent the lapped seam are of identical thickness, are provided with additional rigidity per unit wall thickness by compressing the foam sheet either in-line with the foam extrusion operation or up to several months after extrusion. The cup is characterized by a substantial skin on only the outer surface of the sidewall.

4 Claims, 10 Drawing Figures

METHOD OF MAKING NESTABLE FOAMED PLASTIC CUPS

This is a divisional of application Ser. No. 214,847, filed Jan. 3, 1972, and now abandoned.

BACKGROUND OF THE INVENTION

This invention relates to the manufacture of cups, and more particularly to nestable cups made from compressed, foam sheet plastic. Disposable, foam sheet plastic cups have gained a substantial portion of the market which formerly used only cups made of paper. The greatest inroads made in this market by foamed plastic cups have been in the line of hot drink cups.

It is well known in foam plastics art that good thermal insulation may be obtained by providing the foam plastic cup with thick walls, but thick walls cause a corresponding increase in the nesting height of a stack of such cups. It is essential that nesting height be small to achieve low shipping costs and large capacity per unit volume in equipment such as vending machines where such cups might be used.

Most hot drink cups are manufactured by a bead molding process. The problem with this type of cup is that, due to expansion of the beads prior to molding, the cup cannot be made thin enough for many applications, such as vending machines. Thus, a second method of manufacturing hot drink cups was devised (see U.S. Pat. Nos. 3,069,725 and 3,312,383) wherein one or two pieces of foam sheet are molded to form a cup. However, the foam sheet molding methods present the problem of cracking when it is desired to form small diameter frustrums of cones. The blanked, arcuate sidewall must be wrapped around a small diameter, cup-shaped male mold or inserted into a female cavity prior to the molding operation and the presence of a substantial skin (a layer of very high density foam, approaching the density of the solid plastic itself) on the inner surface or both surfaces of the foam sheet is likely to result in cracks or corrugations, which will not be corrected in the subsequent molding operation.

The instant invention solves the problems outlined above by providing a disposable, plastic foam, heat sealed cup characterized by a unique cell size arrangement and surface characteristics.

SUMMARY OF THE INVENTION

According to the present invention, a plastic foam cup is manufacture which is suitable for manual use and particularly adapted for use in vending machines, owing to better stacking and good rigidity resulting from a novel method of manufacturing the cup. The cup comprises a compressed, foam sheet, plastic sidewall having a fusion sealed, lapped seam, wherein the lapped seam and the sidewall immediately adjacent the lapped seam are of identical thickness, the sidewall increasing in cell size inwardly from the outer surface, and a bottom wall fusion sealed to the sidewall.

The method of manufacturing the above cup features a step of precompressing the foam prior to cup fabrication. The method comprises several steps, beginning with the first key step of extruding foam sheet plastic characterized by a substantial skin on one surface, fine cell size adjacent the skin, and a general increase in cell size as the other surface is approached. The surface with the substantial skin becomes the outer surface of the cup, so that the cup exterior presents a smooth, satin-like finish. The other surface of the sheet adjacent the larger cell structure has little or no appreciable skin and becomes the inner surface of the cup, so that the plastic may be wrapped around a cup-shaped male mold or inserted into a female mold without danger of disfiguring either surface. Since the inner surface is compressed more then the outer surface in wrapping the sheet plastic around the male mold or inserting it into a female mold, it is advantageous to have the surface which is capable of the maximum compression become the inner surface.

The next step is the second key step of the instant invention: compression of the foam sheet plastic, either in-line with foam sheet plastic extrusion or up to several months thereafter. The compression step results in a decrease in the cell size of the foam sheet plastic, which results in a higher density foam sheet than is otherwise obtainable from the extrusion process, permitting the use of higher density foam than is otherwise possible. The higher density foam results in improved wall rigidity per unit thickness of the molded articles, provided molding does not result in re-expanding the foam sheet to its original thickness. The higher density foam also results in better nestability and stacking. Compression also allows the thickness of the foam sheet to be closely controlled, which is very important for the subsequent molding operation. Another important benefit obtained by compressing the foam is that the surface of the foam is rendered more suitable for in-line, or web printing, and smoother and more attractive. Furthermore, good seals are obtained without the need of pre-assembly with the use of solvents or adhesives. Also, cups made from compressed foam will have closer nesting than cups of the same rigidity made from uncompressed foam.

The final steps of the method include cutting a blank from the compressed foam sheet plastic to form the cup sidewall, and joining the sidewall blank with a bottom wall blank not necessarily formed from the compressed foam sheet plastic to form a cup having lapped seam on the sidewall with a bottom seal either on the sidewall or bottom wall.

DESCRIPTION OF THE PREFERRED EMBODIMENT

Figure 1:
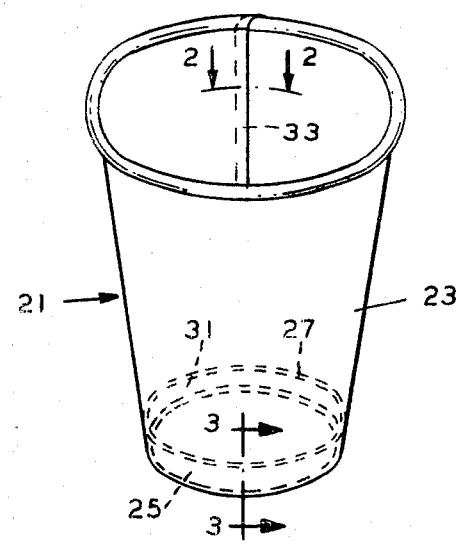
FIG. 1 is a perspective view of a cup of the present invention.
Figure 3:
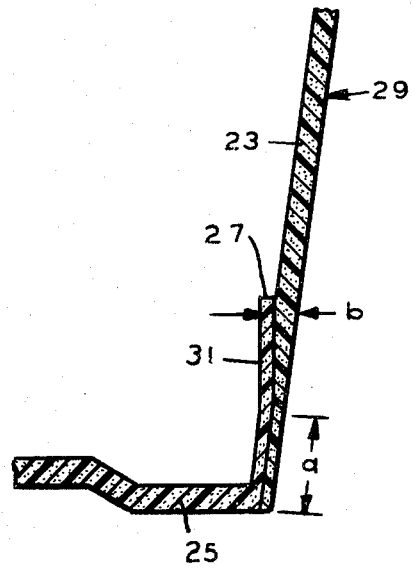
FIG. 3 is an enlarged, fragmentary, sectional view taken on the vertical plane indicated by the line 3—3 of FIG. 1.
Figure 4:
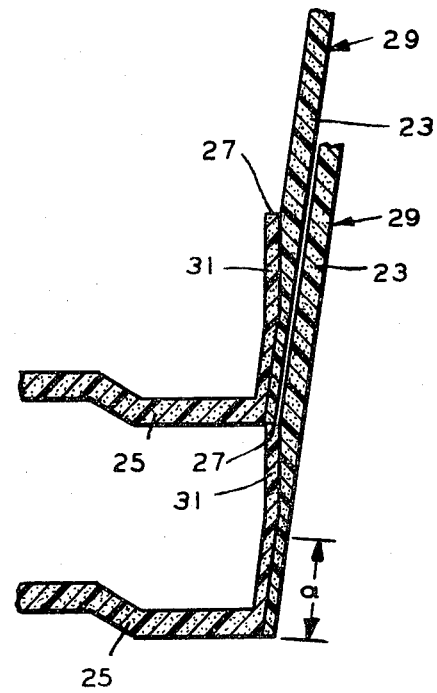
FIG. 4 is an enlarged, fragmentary, sectional view similar to FIG. 3 but showing two cups nesting together.

The preferred embodiment of a cup made according to the present invention is a cup 21 as shown in FIG. 1. The sidewall 23 of the cup 21 is formed from foam sheet plastic. The cup bottom wall 25 need not be formed from foam sheet plastic, but could be formed from beaded plastic foam or unfoamed plastic. As long as either the sidewall 23 or the bottom wall 25 is formed from an expandable, foamed plastic material, a stacking ledge 27 (see FIGS. 3 and 4) can be molded into the cup 21.

The cup 21 is characterized by a substantial skin 29 on the outer surface of the sidewall 23, as well as by a variation in cell size throughout the thickness of the sidewall 23. The cell size variation is discussed below with references to FIGS. 5–10. The cup 21 is further characterized by leakproof compression seals which are created between the upturned portion 31 of the bottom wall 25 and the sidewall 23, and along the lapped seam 33. The leakproof, compression seal on the bottom wall 25 is formed by compressing the bottom wall upturned portion 31 and the sidewall 23 together into a uniform sidewall thickness along the distance "A" of their lower boundary. Compressive forces are also exerted along the entire boundary where the upturned portion 31 and sidewall 23 are in contact and along the entire lapped seam 33.

Figure 2:
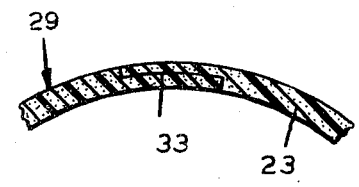
FIG. 2 is an enlarged, fragmentary, sectional view taken on the horizontal plane indicated by the line 2—2 of FIG. 1.

Another characteristic of the cup 21 is the identical thickness of the sidewall lapped seam 33 and the sidewall 23 immediately adjacent the seam 33. As seen in FIG. 2, the sidewall 23 overlaps on itself, but in molding, the lapped seam 33 is compressed to the thickness of the mold cavity. The adjacent portion of the sidewall 23 freely expands to the identical thickness. It should be noted that ribs, protrusions or depressions could be introduced on the sidewall 23 other than on the lapped seam 33.

The preferred method of making the cup 21 starts with extruding foam sheet from either polystyrene or rubber-modified polystyrene. It is suggested that the extruded foam sheet (see FIG. 5) have a density of 16 to 17 pounds per cubic foot and a thickness of 35 to 40 mils. In practice, the initial thickness of the extruded sheet is unimportant; only the final desired weight per unit of surface area is important.

The foam sheet is extruded from a blend of polystyrene resin, nucleating agent and lubricant into which a gaseous hydrocarbon has been injected. Normal pentane is the gaseous hydrocarbon which allows the foam to be easily compressed either in-line with the foam extrusion operation or up to several months after extrusion.

In extruding the polystyrene foam sheet it is essential to the present invention that one surface of the sheet be formed with a substantial "skin". A skin in this case is defined to be a layer of very high density foam, approaching that of solid polystyrene itself. The presence of a substantial skin 29 on the outer surface of the foam and the absence of a substantial skin on the inner surface of the foam (see FIGS. 5, 7 and 9) is a critical factor in determining if a foam sheet is suitable for forming on or in a small diameter mold without the formation of cracks or corrugations. The skin 29 maintains continuity of structure, affords a degree of toughness and enables foam sheet which has been preprinted to stand up to subsequent steam molding without developing any pick off problems with the ink. The skin 29 helps retain the ink on the foam sheet because the skin does not appreciably change on exposure to heat and steam, so that the ink cannot be moved. The lack of a skin on the inner surface allows the foam cells to be compressed upon bending, which prevents cracking in the foam. This effects is analagous to composite beam theory in structural design.

Figure 5:
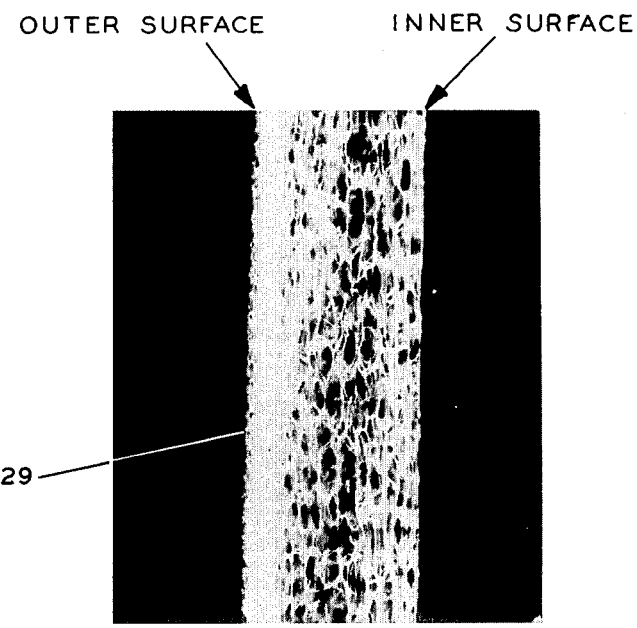
FIG. 5 is a cross sectional photogram showing a sample of extruded, uncompressed foam sheet used for the cup sidewall, looking into the direction of extrusion.

Producing an extruded foam sheet having a substantial skin on one surface only is most easily accomplished by impinging cooling air on the outer surface of the sheet after it has left the extruding orifice and before complete foaming or formation of the individual cells adjacent the impinged surface is achieved, so that in the extruded, uncompressed foam sheet, the cells adjacent the impinged surface are smaller and more rigid than the cells remote from this surface (see FIG. 5). The effect of the cooling air is to inhibit the expansion of the surface cells, so that they are smaller than those cells remote from the surface which continue to expand after extrusion. The inpinged surface naturally becomes the outer surface of the cup sidewall 23. Another method of producing a foam sheet having a skin on one surface only is disclosed in U.S. Pat. No. 3,311,681.

After the foam sheet is extruded to a thickness of 35 to 40 mils, it is mechanically compressed, either in-line with the extrusion operation, or up to several months thereafter, to a thickness of about 23 to 26 mils. The foam sheet now may be printed if desired and slit to the widths required by the cup size to be made. Slit rolls of foam sheet may also be prepared in narrow widths to be used in the bottom forming operation. However, it is also possible to use beaded polystyrene foam or solid, unformed polystyrene as the bottom wall.

Once the cup sidewall blank is cut to the desired size, it may be rolled into a cup sidewall shape and inserted into a female mold. Preassembly of the sidewall and bottom wall blank is not necessary. The bottom wall blank is preferably pre-formed to the desired upturned shape (FIG. 3), but it need not be pre-formed, as it will be formed when the molds are closed.

The bottom wall blank is then placed onto the tip of a male mold and held there by vacuum. The male mold is then moved relatively into the female mold to position the bottom wall blank inside the sidewall blank at the bottom of the female mold. At this point, the sidewall blank and bottom wall blank form an unsealed cup. The male and female molds are not fully closed, but rather a gap of 30 mils is left between them in the sidewall area to produce a cup 21 with a sidewall 23 having a thickness of 30 mils. Since the compressed foam sheet sidewall blank is less than 30 mils thick, the mold cavity permits expansion of the foam sheet to 30 mils thickness, thereby providing a uniformly thick sidewall 23.

Producing the stacking ledge 27 and the leakproof compression seals between the bottom wall upturned portion 31 and the sidewall 23 and along the lapped seam 33, wherein both the bottom wall 25 and sidewall 23 before molding are approximately 25 mils thick, is accomplished by leaving a 30 mil gap between the male and female molds along the distance $a$. Since the bottom wall upturned portion 31 and the sidewall 23 together are about 50 mils thick before molding, it is obvious that along distance $a$ there is no expansion of the foam, but rather mechanical compression to assist in forming the leakproof seal. The width $b$ (FIG. 3) of the cup 21 across the stacking ledge 27 is about 55 mils (determined by the gap between the male and female molds), which means that there is room in the molding process for about 5 mils expansion. The compressive forces are generated by both mechanical pressure exerted on the foam due to the matched molds and the internal pressure generated in the foam when it is heated during the molding cycle.

The molding cycle begins by passing steam at a pressure of 30–60 p.s.i. through internal flow chambers of the molds for 5 to 8 seconds. About 2 to 3 seconds after steam begins to pass through the internal flow chambers, live steam is introduced into the 30 mil mold gap to contact the foam for a period of 0.5 to 2.0 seconds. The live steam is important as it effects a rapid expansion of the foam, thereby filling the 30 mil mold gap.

Water at 80° to 95°F. is then circulated through the internal flow chambers of the molds to cool the molded cup 21. Cooling continues for approximately 6 seconds, the period usually required for the cup temperature to reach 160°F. Compressed air is then circulated through the molds for about 2 seconds to remove any remaining condensate or coolant. The molds open during the air purge phase of the cycle.

The molded cup 21 is then ejected into a top curling station if a rolled lip is desired. It is also possible to obtain a lip by using a set of molds allowing further expansion into a desired lip configuration. Ejection is accomplished by compressed air either with or without mechanical assist.

The molds are then purged either by internal streams of air or internal preheating with steam before the start of the next cycle.

It has been discovered that the steam molding, in addition to effecting rapid expansion of the foam, also provides a very shiny finish to the surfaces of the cup.

Figure 6:
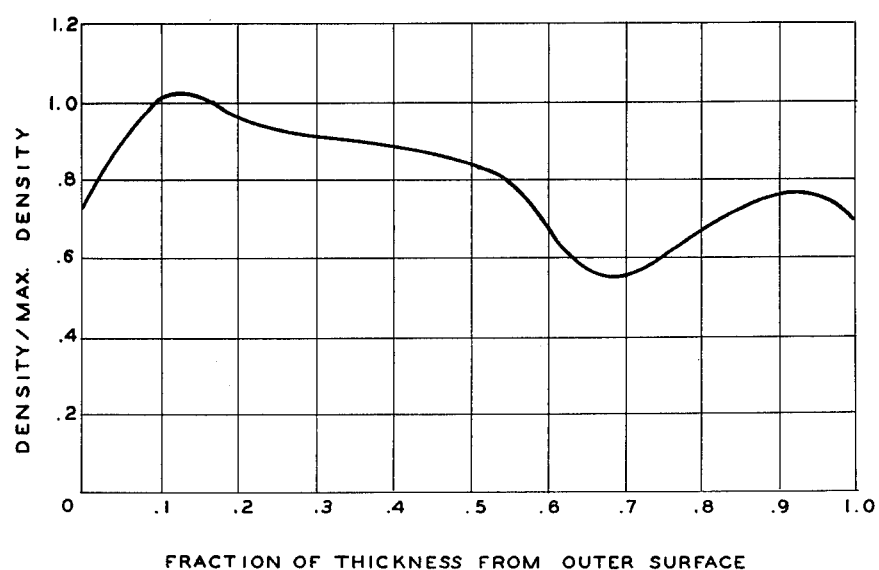
FIG. 6 is a normalized optical density versus thickness curve in dimensionless form for the same sample whose photogram appears in FIG. 5.

It has been explained above that the cell size variation throughout the thickness of the cup sidewall 23 is critical. A study was undertaken to determine the mass density gradient through the thickness in samples of polystyrene foam. Two optical techniques were used: photograms (FIGS. 5, 7 and 9) and microdensitometry (FIGS. 6, 8 and 10). The results showed conclusively that there are density gradients in the tested foam. Cell size was found to be the controlling effect in optical density, optical density correlating the mass density.

The first method for determining the density gradient was a quantitative one utilizing the Ansco (GAF) Model IV Automatic Recording (Optical) Microdensitometer. This device scans a very small portion of the sample (0.2 mils wide by 3.2 mils high) that is illuminated from behind, and measures the intensity of the transmitted light with a photomultiplier tube. Three sample pieces of foam (0.75 inch square) are cut respectively from the extruded, uncompressed foam (FIGS. 5 and 6), the compressed foam (FIGS. 7 and 8) and the molded cup (FIGS. 9 and 10). Each sample piece is then held snugly in a precision ground steel clamp. Next, the foam sample is sliced off with a fresh razor blade repeatedly, each time advancing the foam to expose just a few mils. The result is a series of thin slices of foam. By inspection with a hand lens, a single, uniform, undamaged slice was chosen for study for each of the three stages of the cup. In FIG. 6, 8 and 10, the optical density versus thickness curves are presented in dimensionless form, the outer surface of what is to be the cup being represented as "O" on the horizontal axis. To make comparisons of different width samples possible, and to eliminate variation because of different optical density reading on the original charts due to variation in thickness and not in mass density, the curves were normalized in both dimensions. It should therefore be noted that the height of a curve is not equivalent to any absolute measure of mass density. Each of the curves in FIGS. 6, 8 and 10 represents the averaging of five scans of the material at different points.

Figure 7:
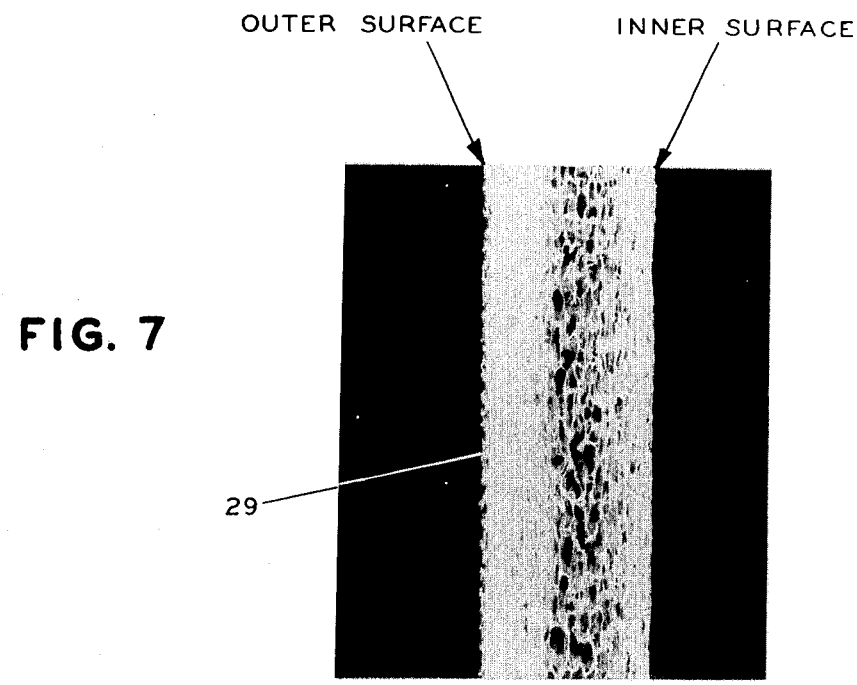
FIG. 7 is similar to FIG. 5 but shows the sheet after it has been compressed.
Figure 8:
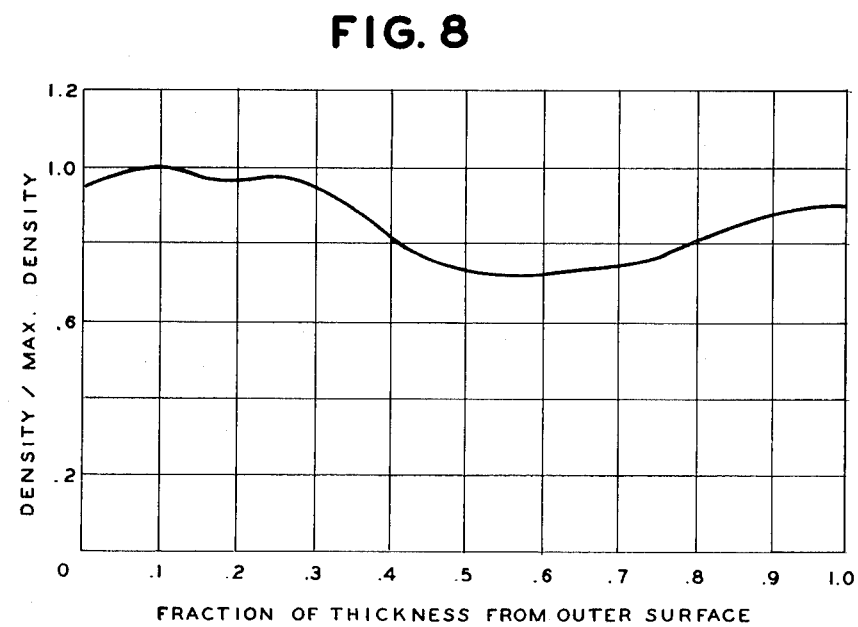
FIG. 8 is a normalized optical density versus thickness curve in dimensionless form for the same sample whose photogram appears in FIG. 7.
Figure 9:
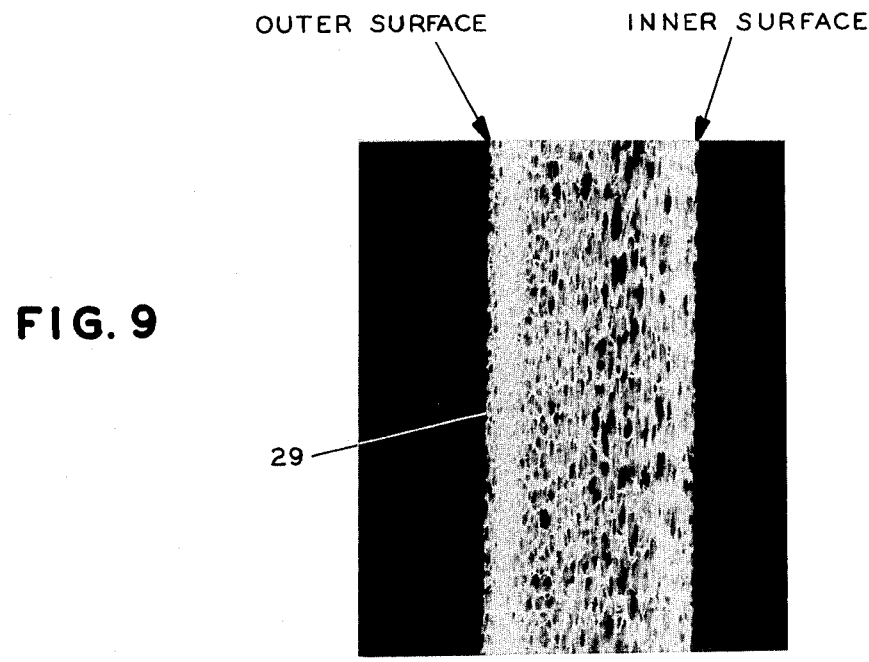
FIG. 9 is similar to FIG. 7 but shows the compressed sheet after it has been molded into a cup.
Figure 10:
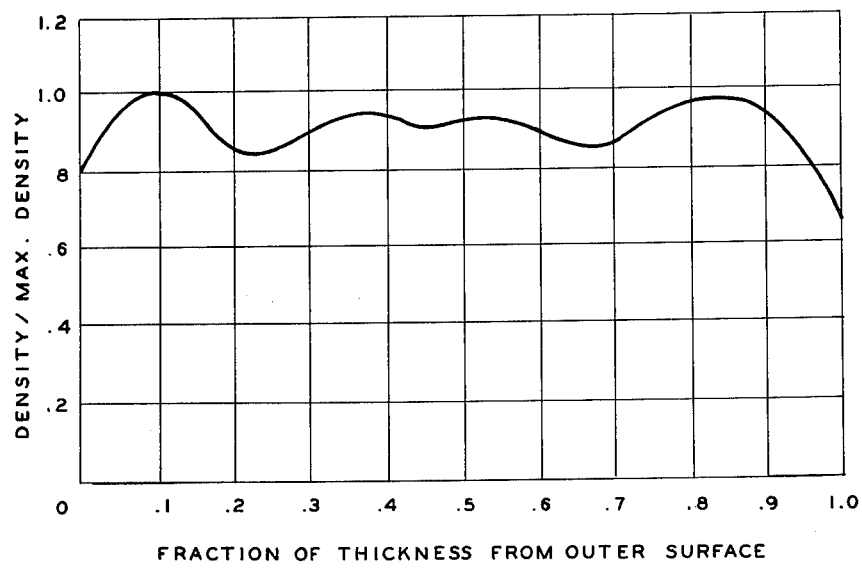
FIG. 10 is a normalized optical density versus thickness curve in dimensionless form for the same sample whose photogram appears in FIG. 9.

FIGS. 5, 7 and 9 are photograms of the same samples used to obtain the microdensitometer traces of FIGS. 6, 8 and 10. A photogram is created by using a physical object as the negative to make a photographic print. In this case, the foam samples were placed on a negative carrier of an enlarger, and the transmitted light image was projected onto enlarging paper giving about 20 × magnification.

Referring to FIGS. 5–10, it can be seen that there is a variation in optical density in all the samples. In the photograms, a lighter area corresponds to higher optical density. It is not surprising that the curves correspond well with the photograms. Whiter portions in the photograms invariably correspond to higher optical densities in the curves.

Considering the mechanism by which the cells grow, there is no doubt that the larger the cells, the lower the mass density. Further, the studies revealed that the optical density correlates with cell size. Ergo, the optical density is a direct measure of the mass density, although the exact relationship — linear or nonlinear — is not established, As FIGS. 6–10 indicate, the variation in cell size is derived from the foam extrusion process. The skin 29 can be seen on the outer surface, but because it is optically clear, permitting the light to pass through it, the photograms are not entirely accurate where the outside surface skin 29 is concerned. FIGS. 6–10 show the foam has its highest density (smallest cell size) in a uniform area for the outside 40% of the sheet. The core has the lowest density, the inner surface being intermediate in density (cell size). A comparison of FIGS. 7 and 8 with FIGS. 5 and 6 reveal that compressing the extruded foam sheet reduces the cell size (density) variation as well as making the sheet more dense. An evaluation of FIGS. 9 and 10 shows that the steam molding of the cup has two effects. First, because of the foam expansion in the mold, the overall density is reduced. Second, the density variation is smaller, i.e. the density and cell size are more uniform, so that the inner and outer surfaces which were originally more dense have undergone the greatest reduction in density.

It is thought that the invention and many of its attendant advantages will be understood from the foregoing and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method of making from foamed plastic sheet material a molded, lapped seam, fused cup having wall portions thinner than the initial sheet material, leakproof seals between the bottom and sidewalls and wherein the seam and the sidewall are of identical thickness comprising the steps of:

1. providing an extruded, foamed plastic sheet material having a density of about 16 to 17 lbs./ft.³ and a substantial skin on its outer surface only, a density gradient wherein the cell size of said sheet increases inwardly from said outer surface and a thickness greater than the final sidewall thickness;
2. comprising said extruded sheet to a thickness less than that of the final sidewall thereby decreasing the cell size variation;
3. forming a blank from said compressed sheet of suitable shape and size to form the sidewall of said cup;
4. providing mold means comprising female and male mold members;
5. positioning said sidewall blank in said female mold member;
6. positioning a blank of suitable shape and size to form the bottom wall of said cup on said male mold member;
7. joining said mold members sufficiently to form a mold cavity wherein the mold members are spaced an amount greater than the thickness of said compressed sidewall blank and equal to the thickness of the final sidewall of said cup; and
8. fusing said sidewall and bottom wall blanks thus positioned in said mold cavity in the presence of steam to expand said compressed sheet into the space between said mold members to form a cup having a sidewall increased in thickness and decreased in cell size variation from that of the compressed sheet.

2. The method of claim 1 wherein said plastic foam sheet material having a substantial skin on its outer surface and density gradient provided in step (1) is obtained by extruding foam plastic through an orifice and impinging cooling air on the outer surface of said sheet as it is extruded.

3. The method of claim 1 wherein the thickness of said sheet material is about 35 to 40 mils as extruded, about 23 to 26 mils as compressed and about 30 mils after molding.

4. The method of claim 1 wherein the plastic is polystyrene.

* * * * *

UNITED STATES PATENT OFFICE
CERTIFICATE OF CORRECTION

PATENT NO. : 3,931,380
DATED : January 6, 1976
INVENTOR(S) : ILIE MILA BELIVAKICI, et al It is certified that error appears in the above–identified patent and that said Letters Patent are hereby corrected as shown below:

In the Specification: At column 1, line 49 "manufacture" should be -- manufactured --. At column 4, line 24, "inpinged" should be -impinged--.
--. At column 5, line 56, --small -- should be inserted between "Three" and "pieces". At column 6, line 34, a period should be substituted for the comma; and at line 36, skin should read "skin".

In the claims: At claim 1, column 7, line 10 "comprising" should read -- compressing --.

Signed and Sealed this twenty-fifth Day of May 1976

[SEAL]

Attest:

RUTH C. MASON
Attesting Officer

C. MARSHALL DANN
Commissioner of Patents and Trademarks